F. J. CROOP.
DEMOUNTABLE RIM FOR TIRES.
APPLICATION FILED JAN. 8, 1913. RENEWED FEB. 7, 1916.
1,175,411. Patented Mar. 14, 1916.
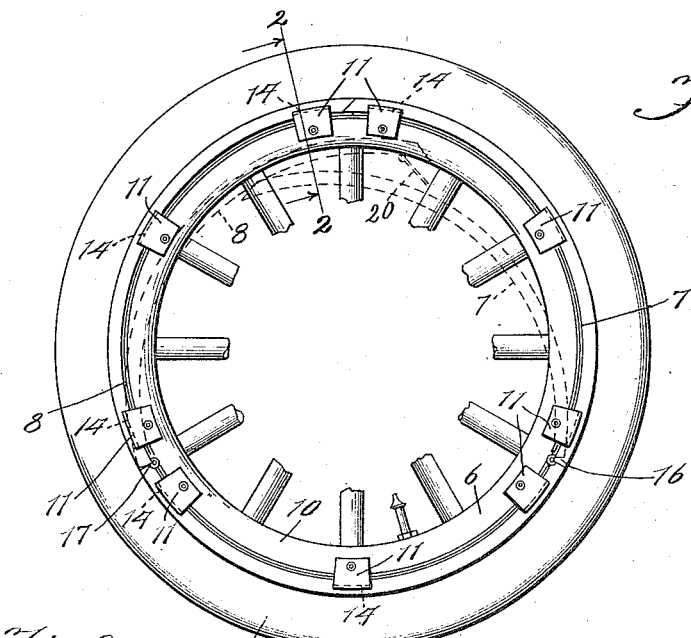
Fig. 1.
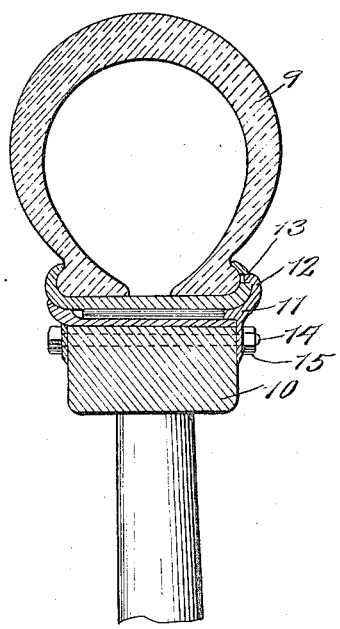
Fig. 2.
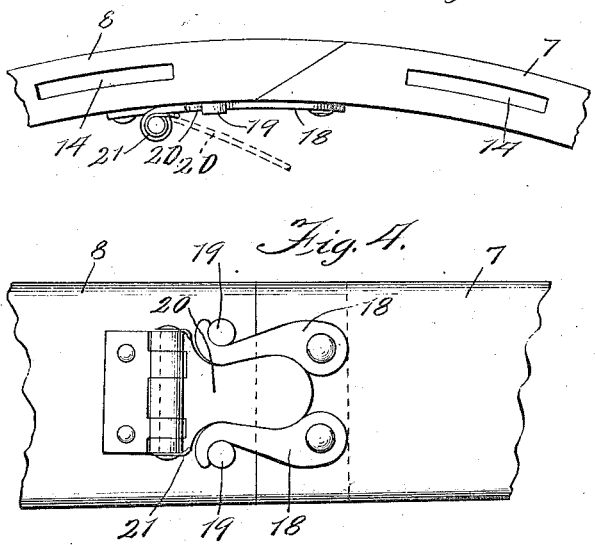
Fig. 3.
Fig. 4.
Witnesses:
Inventor:
Forest J. Croop,
By Bulkley & Durand
Atty.

UNITED STATES PATENT OFFICE.

FOREST J. CROOP, OF WARSAW, INDIANA.

DEMOUNTABLE RIM FOR TIRES.

1,175,411.  Specification of Letters Patent.  Patented Mar. 14, 1916.

Application filed January 8, 1913, Serial No. 740,776. Renewed February 7, 1916. Serial No. 76,774.

*To all whom it may concern:*

Be it known that I, FOREST J. CROOP, a citizen of the United States of America, and resident of Warsaw, Kosciusko county, Indiana, have invented a certain new and useful Improvement in Demountable Rims for Tires, of which the following is a specification.

My invention relates to a split demountable rim for tires.

It relates particularly to such a rim which is readily attached to and detached from a pneumatic vehicle tire. In such constructions it is desirable to employ a rim upon which the tire is mounted, which rim can be readily removed from the wheel of the vehicle, and to then provide means whereby the rim can be readily removed from the tire. My invention accordingly contemplates the employment of a collapsible rim which can be first removed from the wheel and then collapsed so as to permit the rim to be removed from the tire.

These and other objects of my invention will be more readily understood by having reference to the accompanying drawings, in which—

Figure 1 is a side elevation of a wheel upon which is mounted a removable rim embodying the features of my invention. Fig. 2 is a sectional view taken on the line 2—2 in Fig. 1. Fig. 3 is an enlarged side elevation of a portion of the rim. Fig. 4 is a bottom view of the rim portion shown in Fig. 3.

As illustrated, my demountable rim comprises a main portion 6 and two hinged or movable portions 7 and 8. This rim is shaped so as to grip the inner edge of the tire 9 and is removably secured to the outer circumference 10 of the wheel by means of a series of clamps 11. These clamps can be of any desired or suitable form, although I find that very efficient results are obtained by means of the clamp illustrated which consists essentially of an upwardly extending arm 12 having an inturned end portion 13 which is adapted to engage with a groove 14 in the side of the rim. These clamps 11 are bolted in locking position by means of the bolts 14. It will be readily seen that by loosening the nut 15 on the bolt 14, these clamping members can then be moved so that the end portion 13 disengages from the groove 14, and thus the rim and tire can be removed from the wheel.

The two portions 7 and 8 of the rim are hinged to the main portion 6 at the points 16 and 17. These hinged portions are adapted to be swung outward so that they fit together and form a continuous rim for the wheel. In order to hold the sections together, I provide upon the section 7 a pair of locking members 18 which engage with the studs 19 carried by the member 8. In order to hold these locking members 18 in engagement with the studs 19, I provide a spring plate 20 which is held upward by a small spring pressure exerted by the spring 21 so as to prevent these locking members from moving inward out of engagement with the studs 19.

When the rim and tire have been removed from the wheel, by loosening the clamping members, it is then merely necessary to move this spring plate out of engagement with the locking members 18, at which time these members can be disengaged from the studs 19 and the hinged members 7 and 8 then swung downward in the position shown in dotted lines in Fig. 1. It will be seen that the portion 6 of the rim can then be lifted out of engagement with the tire and the rim readily removed.

While I have illustrated my invention in connection with a particular form of clamping members and with particular locking mechanism, it is understood that I do not wish to limit my invention to such construction, but that other suitable types of clamping or locking mechanisms can be employed, likewise the number of these clamps can be suitably varied.

What I claim as my invention is:

1. In a demountable rim for tires, a main section, a hinged section pivoted to each end of said main section, means for locking said hinged sections together, said means comprising a hooked arm carried by one section and adapted to engage with a stud carried by the other section, and a spring operated plate for holding said arm in locking position.

2. In a demountable rim for tires, a main section, a plurality of hinged sections secured thereto, means for locking said hinged sections together, said means comprising a pair of hooked arms carried by one section and engaging a pair of studs carried by the other of said sections, and a spring plate for holding said arms in position.

Signed by me at Warsaw, Indiana, this 31 day of December 1912.

FOREST J. CROOP.

Witnesses:
J. E. STEPHENSON,
P. C. BROWN.